Patented Jan. 19, 1926.

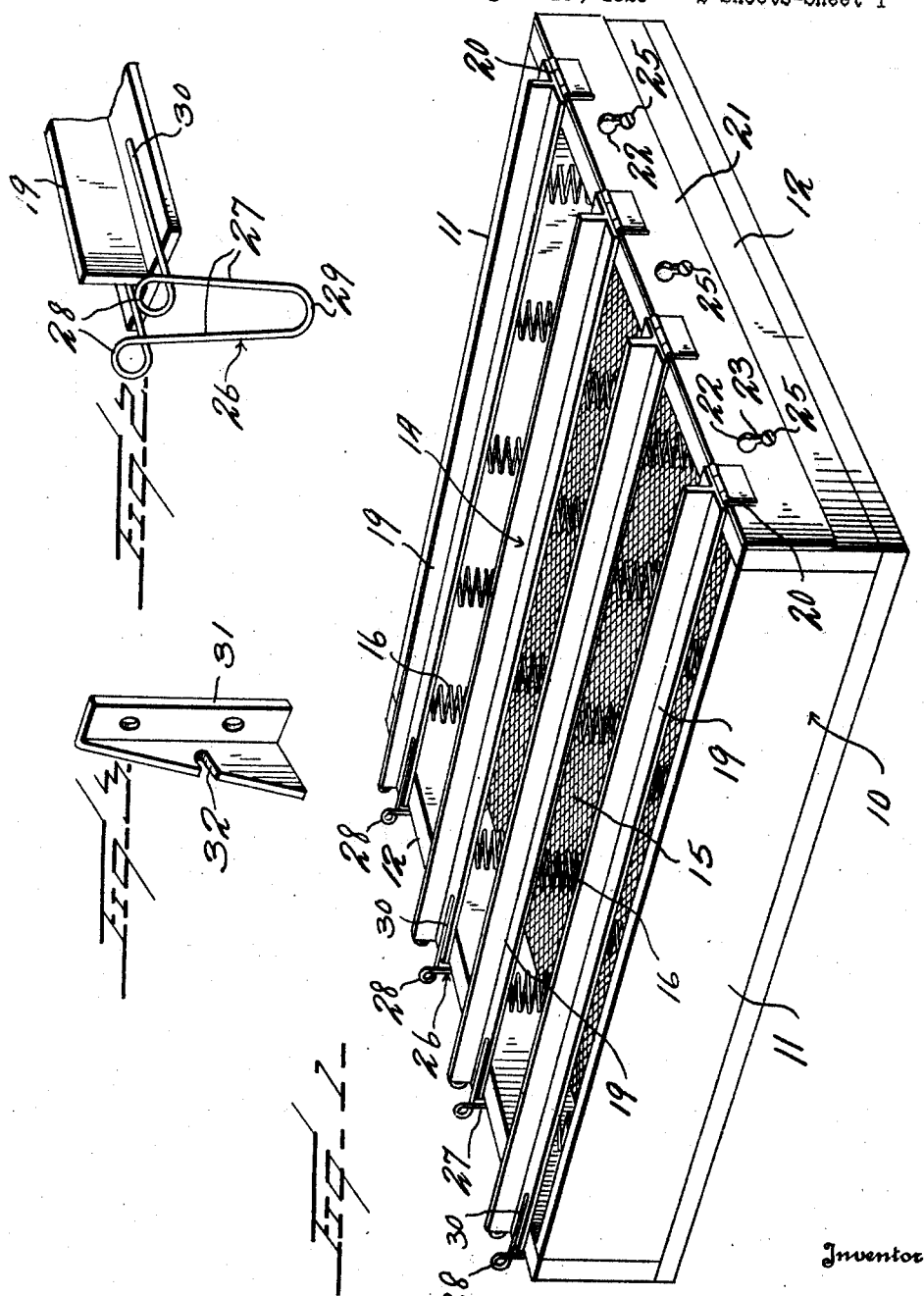

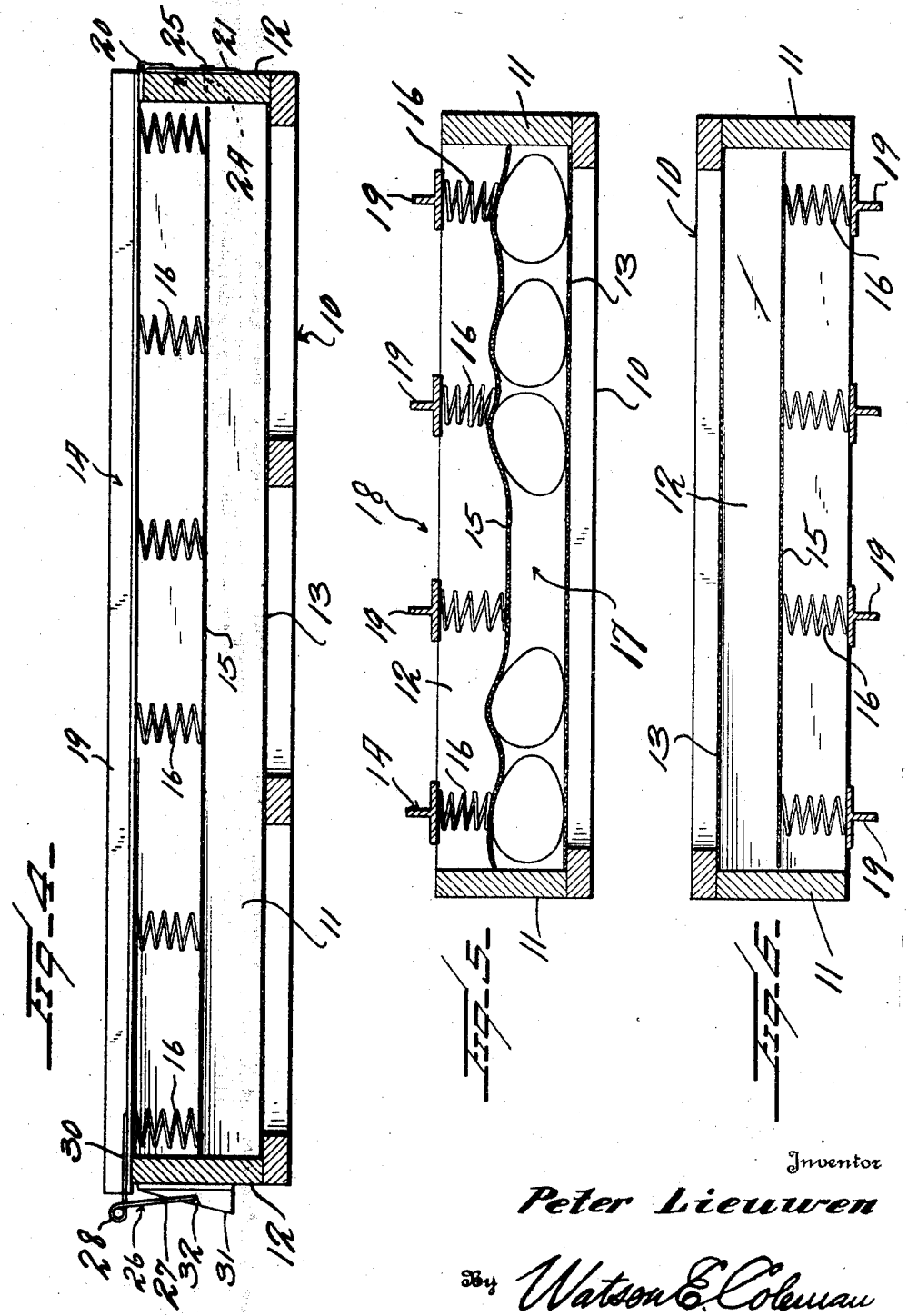

1,569,866

UNITED STATES PATENT OFFICE.

PETER LIEUWEN, OF HARRISON, SOUTH DAKOTA.

EGG TRAY FOR INCUBATORS.

Application filed August 13, 1925. Serial No. 50,072.

*To all whom it may concern:*

Be it known that I, PETER LIEUWEN, a citizen of the United States, residing at Harrison, in the county of Douglas and State of South Dakota, have invented certain new and useful Improvements in Egg Trays for Incubators, of which the following is a specification, reference being had to the accompanying drawings.

This invention relates to egg trays for incubators and has for a particular object thereof the construction of an egg tray facilitating turning of the eggs.

An important object of the invention is to provide a device of this character which will permit the egg tray to be bodily reversed without danger of any of the eggs being broken, destroyed or assuming an improper position during or as the result of such turning movement.

A still further object of the invention is to provide a device of this character so constructed that removal of infertile eggs during the process of hatch will not interfere with the turning operation or permit movement of the eggs.

These and other objects I attain by the construction shown in the accompanying drawing, wherein for the purpose of illustration is shown a preferred embodiment of my invention and wherein:—

Figure 1 is a perspective view of an egg tray constructed in accordance with my invention;

Figure 2 is an enlarged perspective view of the free end of one of the bars showing the spring latch;

Figure 3 is a perspective of the catch employed in combination with the latch;

Figure 4 is a longitudinal sectional view through the tray;

Figure 5 is a transverse sectional view therethrough showing the action of the springs;

Figure 6 is a view showing the tray in its inverted position.

Referring now more particularly to the drawing, the numeral 10 indicates a tray which is of the usual incubator tray construction with the exception of the fact that its side and end walls 11 and 12 are of greater depth than is usual. The bottom of the tray has the usual screen support 13 upon which the eggs may rest.

In accordance with my invention, I provide a cover for the tray comprising an upper structure 14 pivotally and removably connected with the tray as will hereinafter be more fully set forth and a lower structure or screen 15 urged downwardly from the upper structure at a plurality of points by springs 16 secured to this upper structure. The screen 15 is preferably very flexible so that the springs 16 may urge the same downwardly and cause the same to conform to the contour of the egg mass arranged below and extend into any spaces such as indicated at 17 left by the removal of eggs. In order that perfect ventilation may be provided for the egg tray, the upper structure 14 is provided with air openings 18, these air openings being preferably produced by forming the upper structure 14 of a plurality of spaced parallel bars 19 to which the springs 16 are secured in longitudinally spaced relation in any suitable manner.

As a means for securing this upper structure in position upon the egg tray, the bars 19 thereof are each at one end pivotally connected by hinges 20 to a plate 21 adapted to abut and be secured to the outer face of one wall of the egg tray. In the present instance, this wall is shown as one of the end walls 12. The securing means employed is preferably such that the bar 21 may be readily removed from the end wall 12 and to this end the bar is provided with a plurality of key-hole slots 22 having their large ends arranged upwardly and their lower smaller ends, indicated at 23, spaced from the upper edge of the end wall 12 a distance such that the shanks 24 of headed securing elements 25 are engaged therewith when the upper edge of the bar 21 is flush with the upper edge of the end wall 12. The pivoted bars, when swung to overlie the top of the tray with the bar 21 in position, will prevent downward movement of the bar 21 and accordingly escape of the bar from its securing element. The opposite ends of the bars are preferably provided with spring clips 26. In the present instance, these clips 26 are shown as substantially U-shaped when viewed from the end of the bar and the arms 27 thereof intermediate their ends being formed with a spring loop 28 constantly urging the bight portion 29 thereof inwardly beneath the bar. The upper ends of the arms 27 have angular portions 30 by means of which they are attached to the bars 19. The end wall 12 opposite that to which the bar 21 is secured has secured to its outer face a plurality of catch plates 31 corresponding in number and arrangement to the bars 19 and each provided in its outer face with a notch 32 inclining inwardly and slightly upwardly and in which the bight portion 29 of the spring clip may engage.

It will be obvious that these catches will firmly hold the bars 19 against accidental displacement and that as long as these bars are in position, it is impossible for the bar 21 to be displaced. It will also be obvious that the individual spring pressing downwardly upon the flexible screen 15 will enable the screen to move downwardly to engage against undersized eggs or extend into spaces formed by the removal of eggs, thus the necessity for movable partitions or similar expedient for preventing undue movement of the eggs as the tray is reversed, is eliminated.

It will be obvious that the construction hereinbefore set forth is obviously capable of a certain range of change and modification without materially departing from the spirit of my invention and I accordingly do not limit myself to such specific structure except as hereinafter claimed.

I claim:—

1. In combination with an egg tray having relatively deep side and end walls and a screened bottom upon which the eggs may rest, a structure removably secured to the egg tray comprising an upper structure overlying the upper edge of the tray, a plurality of transversely and longitudinally spaced springs secured to the upper structure and extending downwardly therefrom and a flexible screen for engaging the upper surface of the eggs, said screen being engaged by the lower ends of the springs, said top structure including a plurality of parallel bars adapted to overlie the upper end of the tray, an attaching bar to which the ends of the first named bars are secured, means detachably connecting the attaching bar to one wall of the incubator tray from which the bar is unremovable while the first named bars overlie the top of the tray and means at the opposite ends of the first named bars for detachably securing the first named bars to the opposite wall of the tray.

2. In combination with an egg tray having relatively deep side and end walls and a screened bottom upon which the eggs may rest, a structure removably secured to the egg tray comprising an upper structure overlying the upper edge of the tray, a plurality of transversely and longitudinally spaced springs secured to the upper structure and extending downwardly therefrom and a flexible screen for engaging the upper surface of the eggs, said screen being engaged by the lower ends of the springs, said top structure including a plurality of parallel bars adapted to overlie the upper end of the tray, an attaching bar to which the ends of the first named bars are secured and means detachably connecting the attaching bar to one wall of the incubator tray from which the bar is unremovable while the first named bars overlie the top of the tray.

3. In combination with an egg tray having relatively deep side and end walls, and a screened bottom upon which the eggs may rest, a structure removably secured to the egg tray comprising an upper structure overlying the upper edge of the tray, a plurality of transversely and longitudinally spaced springs secured to the upper structure and extending downwardly therefrom and a flexible screen for engaging the upper surface of the eggs, said screen being engaged by the lower ends of the springs, said top structure including a plurality of parallel bars adapted to overlie the upper end of the tray, an attaching bar to which the ends of the first named bars are secured, means detachably connecting the attaching bar to one wall of the incubator tray from which the bar is unremovable while the first named bars overlie the top of the tray, a spring latch carried by the free end of each bar and catches for the latches secured to the wall of the incubator tray.

4. In combination with an egg tray having relatively deep side and end walls and a screened bottom upon which the eggs may rest, a structure removably secured to the egg tray comprising an upper structure overlying the upper edge of the tray, a plurality of transversely and longitudinally spaced springs secured to the upper structure and extending downwardly therefrom, a flexible screen for engaging the upper surface of the eggs, said screen being engaged by the lower ends of the springs, said top structure including a plurality of parallel bars adapted to overlie the upper end of the tray, an attaching bar to which the ends of the first named bars are secured and means detachably connecting the attaching bar to one wall of the incubator tray from which the bar is unremovable while the first named bars overlie the top of the tray, comprising headed elements mounted on said wall, the attaching bar having key hole slots having their large ends arranged uppermost and their small ends engaged with said securing elements when the upper surface of the bar is flush with the upper edge of the wall.

In testimony whereof I hereunto affix my signature.

PETER LIEUWEN.